UNITED STATES PATENT OFFICE.

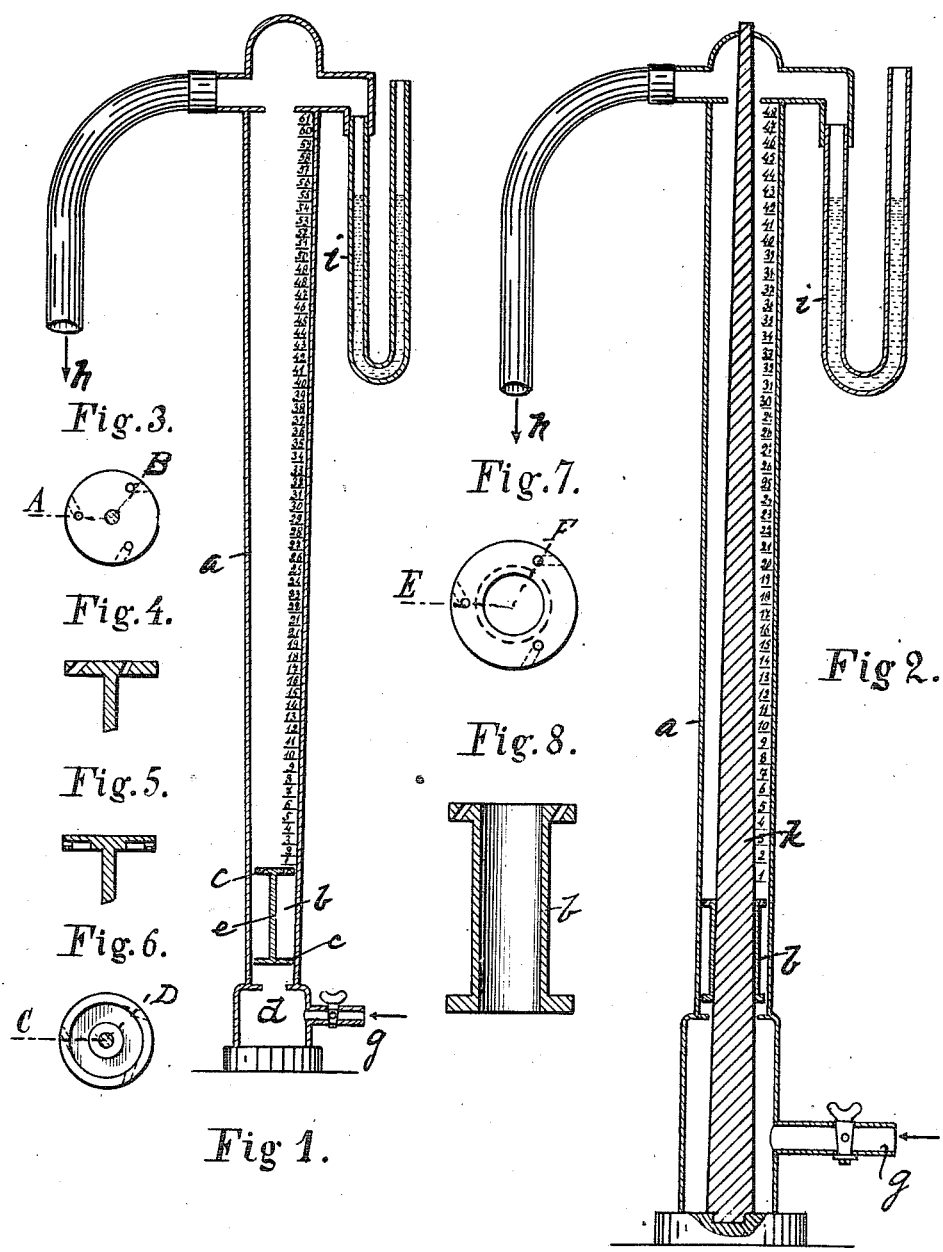

CHARLES KÜPPERS, OF AIX-LA-CHAPELLE, GERMANY.

FLOW-INDICATOR.

979,516.

Specification of Letters Patent. Patented Dec. 27, 1910.

Application filed August 30, 1909. Serial No. 515,325.

*To all whom it may concern:*

Be it known that I, CHARLES KÜPPERS, a citizen of the German Empire, residing at Aix-la-Chapelle, State of Prussia, Germany, have invented a Flow-Indicator, of which the following is a complete specification, reference being had to the accompanying drawings.

The object of the present invention is to provide a flow indicator or a gas measurer for the purpose of reading the quantity of gas of any kind flowing at any desired moment for a fixed time.

The invention is clearly illustrated in the accompanying drawings in which:

Figure 1 is a substantially central vertical section of my improved device. Fig. 2 is a similar view of a modified form. Fig. 3 is a view of the disk and integral float in section. Fig. 4 is a vertical section through the disk on line A—B Fig. 3. Fig. 5 is a section on the line C—D of Fig. 6. Fig. 6 is a modified form of disk. Fig. 7 shows still another form. Fig. 8 is a longitudinal section through the disk and integral float on line E—F Fig. 7.

Like letters of reference indicate like parts in the different views.

Fig. 1, shows one form of the device, in which $a$ is a conical pipe. In this pipe is a float $b$ consisting of circular disks $c$ which are connected by a staff or stem $e$. The upper disk $c$ of the float $b$ is provided with passages $f$ which for example may be disposed horizontally on a tangent, or inclined slits may be provided.

The operation is as follows: The gas to be measured enters into the space $d$ through the inlet $g$. The float $b$ rises and makes its appearance momentarily, the pressure beneath the float and that of the flowing gas above being equal. The gas flows out afterward through the outlet $h$. In consequence of the inclined canals $f$ the float is given a quick rotation on its vertical axis, wherefore a defective working through sticking of the float is impossible.

Another form of flow indicator, which has the same purpose is represented in Fig. 2. The pipe $a$ need not be conical, but may be cylindrical as here shown. Within the pipe is a cone $k$ which the pipe $a$ surrounds concentrically. The float $b$ incloses cone $k$ and is provided with inclined passages like the form shown in Fig. 1 with the difference that the member joining the disks is cylindrical and surrounds the cone.

The measurer can be directly used in connection with a pressure measurer $i$, as seen in Figs. 1 and 2.

It is important that the float be constructed to rotate, it being understood that the forms herein illustrated are but examples of forms that may be advantageously employed.

What I claim as my invention:

1. An instantaneous flow indicator comprising a tube having an interior fluid capacity of a constantly increasing effective, cross sectional area from one end to the other, a float arranged therein and having separated disks, one of which is provided with channels set obliquely to the radii.

2. An instantaneous flow indicator comprising a tube having an interior fluid capacity of a constantly increasing effective, cross sectional area from one end to the other, a float arranged therein and having separated disks, the disk nearest one end of which is provided with channels set obliquely to the radii, and an inlet pipe disposed beyond the opposite end of said float.

3. An instantaneous flow indicator comprising a tube having a constantly increasing effective, cross sectional area from one end to the other, a cone arranged within said tube, a tubular float surrounding the cone and having a disk with channels set obliquely to the radii, and an inlet pipe near the end of said tube having the smaller cross sectional area.

Dated this 18th day of August 1909.

CHARLES KÜPPERS.

Witnesses:
HENRY QUADFLIEG,
ELISE KALBUSCH.